United States Patent [19]
Pedersen et al.

[11] Patent Number: 5,944,997
[45] Date of Patent: Aug. 31, 1999

[54] SYSTEM FOR MAINTAINING A CLEAN SKEIN OF HOLLOW FIBERS WHILE FILTERING SUSPENDED SOLIDS

[75] Inventors: Steven Kristian Pedersen, Burlington; Henry Behmann, Puslinch, both of Canada

[73] Assignee: Zenon Environmental Inc., Burlington, Canada

[21] Appl. No.: 09/024,417

[22] Filed: Feb. 17, 1998

Related U.S. Application Data

[63] Continuation-in-part of application No. 08/690,045, Jul. 31, 1996, Pat. No. 5,783,083, which is a continuation-in-part of application No. 08/514,119, Aug. 11, 1995, Pat. No. 5,639,373

[60] Provisional application No. 60/067,724, Dec. 8, 1997.

[51] Int. Cl.⁶ ............................ B01D 63/00; B01D 61/00
[52] U.S. Cl. ............... 210/636; 210/321.69; 210/321.79; 210/321.89; 210/257.2; 210/195.2; 210/650; 261/126; 261/DIG. 70
[58] Field of Search ............................... 210/636, 500.23, 210/321.69, 321.8, 321.89, 321.78, 321.79, 257.2, 650, 195.2; 261/124, 126, 96, DIG. 70

[56] References Cited

U.S. PATENT DOCUMENTS

| | | | |
|---|---|---|---|
| 3,153,682 | 10/1964 | Walker | 261/124 |
| 3,242,072 | 3/1966 | Walker | 210/15 |
| 3,501,133 | 3/1970 | Drier et al. | 261/124 |
| 3,953,554 | 4/1976 | Loughridge | 261/124 |
| 5,248,424 | 9/1993 | Cote et al. | 210/636 |
| 5,639,373 | 6/1997 | Mahendran et al. | 210/636 |
| 5,647,988 | 7/1997 | Kawanishi et al. | 210/636 |
| 5,783,083 | 7/1998 | Henshaw et al. | 210/636 |

*Primary Examiner*—Ana Fortuna
*Attorney, Agent, or Firm*—Alfred D. Lobo

[57] ABSTRACT

The outer surfaces of hollow fiber membranes in a skein, or a bank or cassette of stacked skeins, are kept essentially free of solids by maintaining a substantially uniform flow of a stream of coarse bubbles through each of plural orifices in an aerator disposed beneath the fibers. Aerators for skeins used in microfiltration of wastewater in a tank are periodically flushed by injecting flushing air into permeate returned to the tank over a short period. The air is injected into returning permeate for less than 1 minute, preferably less than 20 sec so as to produce discrete masses of water which are flowed laterally through the body of the aerator, cleaning its walls and maintaining the orifices essentially free from plugging.

8 Claims, 3 Drawing Sheets

SYSTEM FOR MAINTAINING A CLEAN SKEIN OF HOLLOW FIBERS WHILE FILTERING SUSPENDED SOLIDS

This application is a continuation-in-part application of Ser. No. 08/690,045 filed Jul. 31, 1996, now U.S. Pat. No. 5,783,083, which is in turn a continuation-in-part application of Ser. No. 08/514,119 filed Aug. 11, 1995, now issued as U.S. Pat. No. 5,639,373 and subsequent to Provisional Application No. 60/067,724 filed 8 Dec. 1997, which is incorporated by reference thereto as if fully set forth herein.

FIELD OF THE INVENTION

This invention relates to economical microfiltration of solids-contaminated wastewater with a skein of hollow fiber membranes ("fibers" for brevity) by maintaining the outer surfaces of the fibers clean. If fibers are not continuously scrubbed with streams of relatively fast-moving "coarse" bubbles, they are quickly fouled. Coarse bubbles range in effective diameter from about 3 mm to about 35 mm, most preferably from 15 mm to 25 mm, measured within a distance of from 1 cm to 50 cm from the through-passages generating them; bubbles smaller than 3 mm in diameter are referred to as "fine" bubbles; fine bubbles, which rise more slowly than coarse, are efficient to transfer oxygen but inefficient to provide effective scrubbing. Any fine bubbles present are incidental and unintentional. A "skein" refers to plural arrays of fibers held together in at least one stack of arrays. The arrays may be linear, circular, or randomly oriented within a stack. Scrubbing fiber surfaces, and not aeration, is the primary purpose of coarse bubbles. Scrubbing relies upon a substantially uniform upward flow of the bubbles of inert gas generated in a "scrubbing aerator" which remains submerged and continuously operational in a substrate while the skein is withdrawing permeate (or clean or filtered substrate). Fouling of the aerator impairs uniformity of such flow, and such non-uniformity results in fouled fibers and inefficient microfiltration. By "inert" is meant "chemically unreactive with either the deposits to be removed, or the liquid from which the deposits were derived". The terms "aerator" or "aerator means" (sometimes referred to as a "diffuser") refer to a device designed to supply inert gas as predominantly coarse bubbles under specified operating conditions; the terms are used for convenience because the inert gas used for scrubbing fibers is typically air; and because the air is expelled through each of a multiplicity of suitably large orifices in the aerator it is referred to as a "coarse bubble aerator". Typically the substrate is contaminated water, or domestic or industrial waste (hereafter "wastewater" for brevity) containing organic solids including microorganisms. Other typical substrates are organic liquids in which the suspended solids are substantially insoluble. The streams of air, issuing from a multiplicity of orifices in an aerator, together form a column of coarse bubbles having sufficient energy to scrub the outer surfaces of the fibers.

THE PROBLEM

Semipermeable membranes having a high flux are not economical filtration means if their surfaces are quickly fouled during operation. Solids, particularly of organic matter, have a high affinity for the surface of such membranes. To date, the best way to minimize fouling of a skein is to scrub the fibers continuously with streams of coarse bubbles rising at a specified rate. It is essential that aeration of a skein be substantially uniform and that the majority of the bubbles, preferably substantially all of them, remain coarse throughout their travel toward the surface of the substrate. By "substantially uniform" is meant that each unit volume within a rising column of bubbles, contains on average, approximately the same number of coarse bubbles as an adjacent unit volume within the column. By "majority of the bubbles" is meant that more than 50% by volume of the scrubbing gas is in the form of coarse bubbles. Such coarse bubble aerators are used to produce streams of fast-rising coarse bubbles, in columns or curtains, within and around arrays of fibers forming the skein. But the aerator itself is quickly fouled by deposits which build up on the inner surfaces of walls of the aerator, plugging orifices in those walls; even partial plugging produces a hindered flow of the stream of the bubbles, which hindered flow is also non-uniform, and results in fouling of the fibers. Fouling of a scrubbing aerator occurs far more easily than in a conventional aerator for municipal wastewater treatment ("municipal aerator") because the total suspended solids concentration in a membrane bioreactor system is typically twice as high as that in a conventional wastewater treatment plant aeration basin. To produce the required uniform flow of bubbles requires that essentially all the orifices be kept open continuously during operation of the skein. Keeping aerators clean by the method disclosed herein is only feasible where returning deposited solids (foulant) into the substrate is acceptable. Though the method disclosed herein may be used to maintain clean orifices in any aerator, there is no overriding reason for using it where uniformity of the flow of coarse bubbles is not of critical importance.

It was only recently recognized that stopping scrubbing of the skein with bubbles for even an hour, causes unacceptable fouling of the skein; therefore it became critical that an essentially continuous uniform flow of a column of bubbles not be substantially diminished, even for an hour during operation of the skein, despite the proclivity of the aerator's body to become internally fouled with solid deposits from the liquid substrate. As of this date, due to the criticality of maintaining an essentially continuous uniform flow of scrubbing air, aerators for vertical skeins are best kept clean by removing them from the substrate, and thoroughly cleaning them. Then, typically, a high velocity jet of water is used, both internally and externally, optionally with brushing the surfaces. Alternatively, the fouled aerator is immediately replaced with a pre-cleaned one. Prior art methods of injecting high pressure air (referred to as "flushing air") or water, sporadically, to flush deposited solids from the internal surfaces of an aerator, have been successful where maintaining aeration in municipal aerators was the goal. Flushing with filtered substrate, or fresh, clean substrate, in a two-phase mixture of permeate and flushing (inert) gas would not be suggested, because to return permeate to the substrate from which it was filtered is counterintuitive.

BACKGROUND OF THE INVENTION

Filtering a substrate through a skein of fibers has long been known in the art. To date, the emphasis has been on maintaining the fibers clean by backwashing them (through their lumens) frequently, either with permeate, or clean water when the substrate is aqueous. Hereafter reference to "permeate" is because it is preferably used, but fresh, clean substrate or water may also be used, if more convenient. Alternatively, the fibers are pressured in their lumens, at frequent intervals, by gas under sufficient pressure to dislodge solids fouling the outer surfaces of fibers in the skein (see U.S. Pat. No. 4,655,927 to Ford). Only recently have skeins been operated for acceptably long periods while being aerated, and even in the case where a skein is arcuate, coarse bubbles were found to be more effective than fine (see U.S. Pat. No. 5,248,424, to Cote et al, col 9, lines 1–9, and col 11, lines 67–68); but the criticality of maintaining substantially equal flow of a stream of coarse bubbles through each of plural orifices in an aerator, irrespective of the orientation of the skein in the substrate, was not known.

Therefore it is not surprising that the art did not consider how to maintain a scrubbing aerator in a sufficiently clean condition to provide the necessary uniform flow. Specifically, the many references teaching microfiltration with a skein of fibers, failed to suggest how to clean clogged orifices in an internally fouled aerator in situ, so as to maintain the skein awash in a uniformly flowing stream of coarse bubbles.

An orifice through which air exits the lateral walls of an aerator, becomes clogged because solids penetrate the interior of the aerator and are deposited on its inner walls forming a sludge or slime which gradually accumulates on the periphery of the orifice. As air continuously passes through the orifice, the sludge is dried, providing a base for the accumulation of yet more sludge which, in turn, is dried, until the orifice is substantially plugged. As the diameter of the orifice is reduced, the size of the bubbles decreases in size, but they also rise more slowly than coarse bubbles, resulting in diminished effectiveness in scouring the essentially vertical, smooth surfaces of the fibers.

Using the method taught herein, a skein of fibers, most preferably in the vertical orientation, is kept continuously operational at equilibrium flux for long enough to be economical in commercial installations. Since fouling of the fibers is exacerbated when enough scrubbing air does not contact the fibers, it is essential that the orifices of the skein's aerator be kept open to provide adequate scrubbing. By flushing a fouled scrubbing aerator at frequent intervals with a specified mixture of permeate (or clean water) and air, optionally also with permeate and/or air, deposits loosened from within the aerator are directly returned to the substrate from which they were removed and the orifices are kept clean which in turn keeps the fibers clean, and operation economical.

Aerators which require cleaning during use are mainly used in the treatment of municipal sewage as described in U.S. Pat. No. 3,153,682 to Walker, inter alia. However, the purpose of such aeration is to provide mixing of the contents of a tank while aerating its contents, not to produce coarse bubbles for the specific purpose of scrubbing fibers. Further, such aeration produces a circulating roll of the contents in the tank (see col 1, lines 11–13). Air was supplied through large orifices in combination with a stream of water against an impingement surface so the air is broken up into fine bubbles and "clogging of the air orifices is virtually never encountered" (see col 1, lines 36–43). To maintain the desired clean orifices for satisfactory operation an orifice velocity of 126 ft/sec (38.4 meters/sec) with a 7" water column head loss, is specified (see col 3, lines 23–27), stating that it is desirable not to let the velocity fall below 70 ft/sec (21.34 m/sec). In his later U.S. Pat. No. 3,242,072 Walker emphasized the importance of maintaining a velocity of 70 ft/sec to prevent "creeping in" of the liquid sewage, and resultant growths' (see col 3, lines 62–64). To ensure adequate margin for maintaining the required air pressure Walker provided a pressure leg, down-flush leg, or blow-off (identified by numeral 31 in FIGS. 1, 2 and 4). To clean the aerator, Walker stops operation to fill risers 16 with liquid to the level of the liquid in the tank so that the entire air pressure is initially available to move the water and force it through a passage in blow-off 31, so that the water flows fast with a scouring effect (see col 4, lines 23–28).

Later, in U.S. Pat. No. 3,501,133 to Drier et al, they again shut off the air supply to flush sludge out of their spargers 24 (see col 4, lines 20–43). To avoid discharging sludge through the orifices 31 they provided "down-flush tubes" extending from the low point of each sparger. As before, the spargers were positioned to contribute to the same over-all rolling movement of the tank's contents being careful not to lose the characteristic of isolated air-lift columns which provided aeration efficiency.

SUMMARY OF THE INVENTION

The method disclosed herein may be used to clean any coarse bubble aerator in which it is essential that substantially every orifice in the aerator produce an essentially continuous, substantially equal flow of coarse bubbles, and, when the end result is that the loosened deposits of foulant are to be reintroduced into the substrate. The method is successful only if periodic flushing is practiced relatively frequently, in the range from about once every 4 hr, to about once every three days. It is particularly useful in the microfiltration of wastewater in which, the efficiency of the filtration is improved despite returning permeate, used to clean the aerators, into the substrate.

It is an object of the invention to maintain a desired permeability of a skein during its operation despite its fibers being fouled to some extent, by either maintaining both the flux and the transmembrane pressure substantially constant, or, changing both proportionally.

It has been discovered that a specified two-phase mixture of flushing gas (air) and permeate, periodically flowed laterally through a fouled aerator for a short period (or "flushing interval"), so as to produce discrete dispersed masses of permeate moving at high velocity, fleetingly traps air between the masses. The short time during which the air is impeded in its escape through a path of least resistance, provides unexpectedly effective removal of fouling solids; and the manner of injection of flushing air into returning permeate results in a non-homogeneous mixture of air and dispersed masses of water which are non-uniformly sized.

Therefore, a method is provided for repetitively, automatically flushing a coarse bubble aerator during spaced-apart flushing intervals, each less than 0.25 hr, preferably from 1 sec to 5 min, after the aerator and skein have been in service for a period in the range from 8 hr to 48 hr, most preferably every 24 hr. Periodic flushing is effected with a two-phase stream of flushing air and permeate in a volumetric ratio of air:permeate in the range from 1:5 to 25:1, more preferably from 1:3 to 10:1, the pressure of each stream being independently sensed and controlled to provide a desired linear velocity of discrete dispersed masses of permeate in the stream. Flushing permeate is supplied through an inlet conduit upstream of and externally to the aerator. Flushing air is mixed with permeate in the permeate line outside the aerator's body during a flushing cycle; the air is supplied at ambient temperature and elevated pressure, above that of permeate flowing in the permeate line, and in addition, from about 5 cm to 50 cm above the hydrostatic head exerted at the lowest orifices in the walls of an open-bottom the aerator; in closed-bottom aerator the pressure of flushing gas has the height of the water-seal leg added to it. During normal operation, though the aerator produces the desired bubbles which scrub the fibers, the mass flow of air through the aerator is insufficient to provide a rolling movement to the substrate, yet sufficient to provide a bubble velocity in the range from about 5 ft/sec to 10 ft/sec (1.5 m/sec to 3 m/sec). Surprisingly, returning permeate to the bioreactor during flushing, thus increasing the overall duty of the skein, improves the yield of permeate by maintaining a lower transmembrane pressure (TMP) than in a non-flushed aerator.

BRIEF DESCRIPTION OF THE DRAWINGS

The foregoing and additional objects and advantages of the invention will best be understood by reference to the following detailed description, accompanied by schematic illustrations of preferred embodiments of the invention, in which illustrations, like reference numerals refer to like elements, and in which.

DETAILED DESCRIPTION OF PREFERRED EMBODIMENTS

When one commences filtration with a virgin skein its initial permeability is much higher than its permeability after several hours of operation even when the skein is scrubbed with bubbles. Permeability is the flux divided by the transmembrane pressure. When scrubbed, the permeability soon reaches a level which can be maintained essentially constant for a long operating period before the skein is so fouled that the permeability begins to decrease continuously. The essentially constant flux is referred to as the equilibrium permeability. Since essentially only coarse bubbles are generated for scrubbing, it will be evident to one skilled in the art that the main purpose of the aeration is neither to obtain oxygen transfer into the wastewater to feed microorganisms therein, nor to provide mixing of suspended solids in the substrate, but to scrub the fibers of the skein producing permeate. In filtration of biochemically treated wastewater with skeins, in addition to the air required for scouring, the oxygen demand of the microbes is conventionally supplied with additional air, referred to as "auxiliary air".

Figure 1:
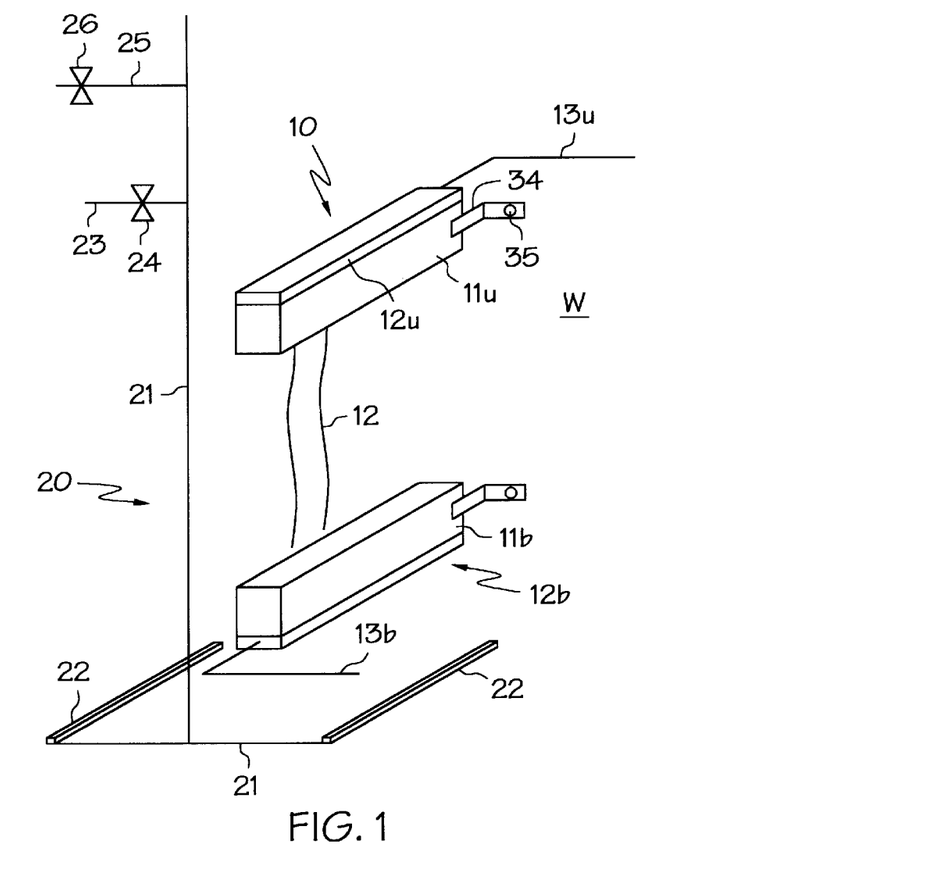
FIG. 1 is a perspective view schematically illustrating a "scrubbing assembly" of a single array (typically a "stack" of multiple arrays is used) in a single submerged skein mounted in a vertical configuration of its fibers, against the wall of a tank, and the skein's aerator. A pair of conventional box-shaped open-bottom aerators is deployed, one on either side of and directly beneath the skein. The aerators and skein are deployed independently.

Referring to FIG. 1 there is schematically illustrated a skein, indicated generally by reference numeral 10, comprising a single vertical stack of plural arrays (only one array is shown) of fibers 12 submerged in a tank (not shown) open to the atmosphere. The skein 10 is aerated with an air distribution means 20. The ends of the fibers 12 are potted in rectangular parallelepiped upper and lower headers 11$u$ and 11$b$ respectively, so that fibers in successive arrays are oriented adjacent each other in the x-z plane, the x-axis being horizontal (left to right in the plane of the paper) and the z-axis being vertical (in the plane of the paper). Adequate aeration to scrub a skein is especially important when each stack of arrays includes multiple arrays, the more the arrays, the more critical is the need for scrubbing the inner arrays. Commercially available skeins have from about 5 to 50 arrays in a stack; and a skein is most preferably formed with two spaced-apart stacks which are scrubbed with curtains of bubbles on each side of the skein, and a central curtain of bubbles between the stacks. As illustrated, the fibers in an array optimally have "slack" in the range from at least 0.1% greater, to less than 5% greater than the fixed distance between upper and lower headers, to afford commercially acceptable operational life of the fibers. Further, the fibers are optimally potted in each header so that the fibers are spaced apart by a flexible support means (not shown) having a thickness corresponding to a desired lateral spacing between adjacent fibers, the support means extending over only each terminal portion of the fibers near their ends, so as to maintain the ends in closely-spaced apart relationship. In less desirable configurations, the fibers may be bundled and potted without a flexible support means, with essentially no slack.

The fibers may be potted in closely-spaced relationship, either linearly in plural equally spaced apart rows across the face of a header in the x-y plane; or alternatively, randomly, in non-linear plural rows so that the fibers are displaced relative to one another in the lateral direction. Yet another choice is a cylindrical configuration as disclosed in greater detail in copending Ser. No. 08/690,045. The particular method of securing the fibers in fluid-tight relationship within each header is not narrowly critical, and forms no part of this invention.

At least one elongated box-shaped header, and preferably each upper and lower header 11$u$ and 11$b$, is fitted with a permeate collecting pan (or trough) 12$u$ and 12$b$ respectively, from which permeate is withdrawn through lines 13$u$ and 13$b$, the header being sealingly bonded around its periphery to the periphery of each collection pan. The upper header 11$u$ is mounted with a mounting bracket 34 and suitable fastening means at one of its ends, to a stud 35 welded to the vertical interior surface of a wall W of the tank. The wall W thus functions as a spacer means which fixes the distance between the upper and lower headers. The lower header 11$b$ is spaced apart from the bottom of the tank, for example, in a manner analogous to that of the upper header 11$u$, so as to provide space directly beneath the skein for a pair of identical open-bottom aerators 22 (such as shown in U.S. Pat. No. 5,032,325 to Tharp) disposed horizontally, one on either side of the skein. Two aerators are shown because skeins, whether single stacks, or multiple stacks, are typically used side by side, requiring aerators between skeins. Alternatively, only one placed directly beneath each skein may suffice, depending upon the configuration and filtration area of the skein and the construction and bubble-generating capacity of the aerator.

The aerators are preferably thin-walled, in the range from 0.25 mm to about 2 mm thick, and are supplied with scrubbing air from a conduit means (an air distribution system) 20, through line 21 which continuously delivers air at low pressure in the range from more than 1 to 1.5 atm, but higher than that required to overcome the head loss due to the transmission piping and depth at which the aerator is to operate. Typically the pressure of scrubbing air is in the range from about 1 cm to about 10 cm, preferably from 2 to 5 cm above the hydrostatic head exerted at the level of the lowest orifices in the walls of the aerator in an open-bottom aerator; and, from about 1 cm to about 30 cm, the pressure being no greater than the hydrostatic head exerted by the height of the water-seal leg of the closed-bottom aerator. The height of the leg which provides the water seal is chosen so that when the aerator is flushed, the major portion of the flushing mixture leaves through the leg rather than through the orifices in the aerator. A relatively low velocity of flushing mixture flowed along and against the inner walls keeps the aerator clean. Line 21 selectively communicates with a permeate supply line 23 preferably from a permeate recycle tank (not shown) from which permeate (or clean water) is introduced into the line 21 under controlled pressure by automatically opening a valve 24 for a chosen, short period, at predetermined intervals. A separate conduit means 23 may be used to deliver permeate to flush the aerator but it is convenient to use the same line 21 which delivers scrubbing air to the aerator.

Line 21 also selectively communicates with a source of flushing air in line 25 by opening valve 26, injecting flushing air at available line pressure in the range from about 2 atm to 5 atm, through appropriate orifice means into line 21 at a controlled pressure, above that of permeate flowing in line 21, and in addition, with sufficient pressure to overcome the hydrostatic head above the submerged aerator(s). If a separate conduit means 23 is used to deliver permeate to the aerator(s) then line 25 is valved to inject the desired amount of air at chosen intervals into the permeate line (separate from line 21).

Scrubbing air at low pressure is introduced into the aerator at a substantially constant rate of flow and at a pressure slightly higher than the hydrostatic pressure exerted by the wastewater at the depth of the aerator. The air and wastewater seek a level within the aerator determined by the pressure and volume of entering air. Once the air/liquid interface is established, the volume of air entering displaces a substantially identical volume of air which exits through orifices 30 (see FIG. 2). The extent to which an orifice is plugged determines the volume of air flowing through that orifice and the size of the bubbles generated through it. The orifices are always open there being no mechanical means to either clean them.

Flushing is preferably controlled by a programmable logic controller (PLC). To initiate a flushing cycle, scrubbing air is first cut off and permeate, preferably at a pressure in the range from 170 kPa to 204 kPa (10–15 psig), is introduced into the line 21 and allowed to flow for a short period. By "short period" is meant from about 5 sec to less than 10 min, preferably less than 5 min, and most preferably about 1 min. A controlled amount of flushing air is injected into the permeate line 21, preferably by automatically opening valve 26, and keeping it open for a desired injection period, less than 1 min, and preferably in the range from about 1 sec to 20 sec, to mix with the permeate and generate the two-phase mixture which is flowed into the aerator. The valves 24 and 26 are sized and constructed with appropriate orifice means, and are electrically connected to the PLC, to control the pressure of each stream so as to form the two-phase mixture having a desired ratio of air:water. To inject the desired volume of air into the permeate line within a specified period of time, most preferably in the range from 1 sec to 10 sec, pressure sensing means are provided on the permeate line 23 and high-pressure air line 25, respectively, which are electrically connected to the PLC so as to set the time during which flushing air is flowed into the plenum of the aerator and the desired pressure, while the valve 26 is kept open. After flushing, the valves for flushing air and permeate recycle are shut-off, and flow of scrubbing air resumed. A typical flushing cycle lasts from 1 min to about 5 min.

Though brief, such short flushing periods result in bursts of the two-phase mixture which are unexpectedly effective to keep the orifices clean enough to produce a substantially uniformly flowing column or curtain of bubbles when the scrubbing air is returned to the aerator.

Figure 2:
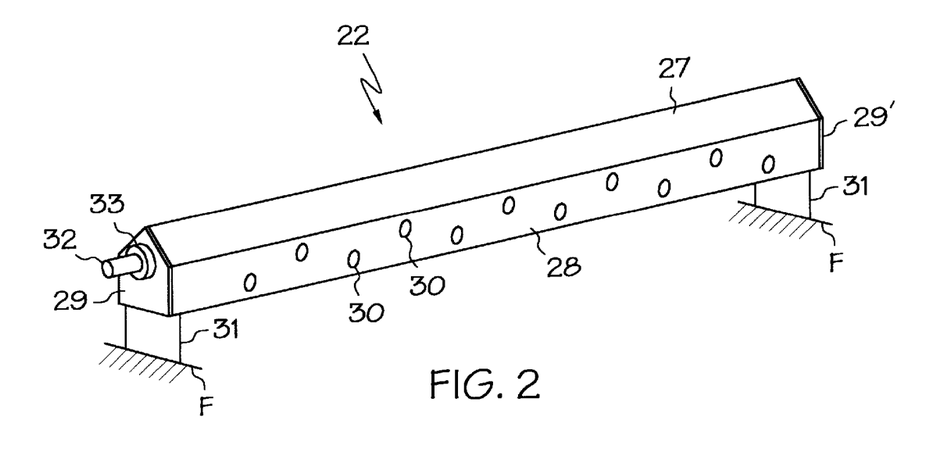
FIG. 2 is a perspective view of one of the conventional open-bottom aerators schematically illustrated in FIG. 1 illustrating a basic construction of the aerator within which the air-liquid interface is determined by the pressure of the air supply.

Referring to FIG. 2, the aerator 22 for the skein shaped as shown in FIG. 1, has an elongated body which includes an arcuate top wall 27, a pair of opposed sidewalls 28 and 28' and end walls 29 and 29' forming an enclosed chamber only the bottom of which is open. The body may be formed by rolling a single sheet of stainless steel and attaching end caps for the end walls 29 and 29'; or the body may be molded from a synthetic resinous material. To connect to the line 21, a nozzle 32 with a threaded end, extends through one end wall and is secured to it with nuts 33 on either side of the endwall. Plural orifices 30 are located laterally along the length of each sidewall, and extend transversely therethrough. The height of the aerator, as determined by its sidewalls and the location of the orifices therein, will determine the location of the air/liquid interface within an air plenum formed during operation. The air plenum is the volume defined by the interface and the inner surfaces of the aerator. The aerator 22 is spaced from the floor F of the tank by struts 31. Aerators having the basic construction described are conventional in the treatment of municipal sewage.

Figure 3:
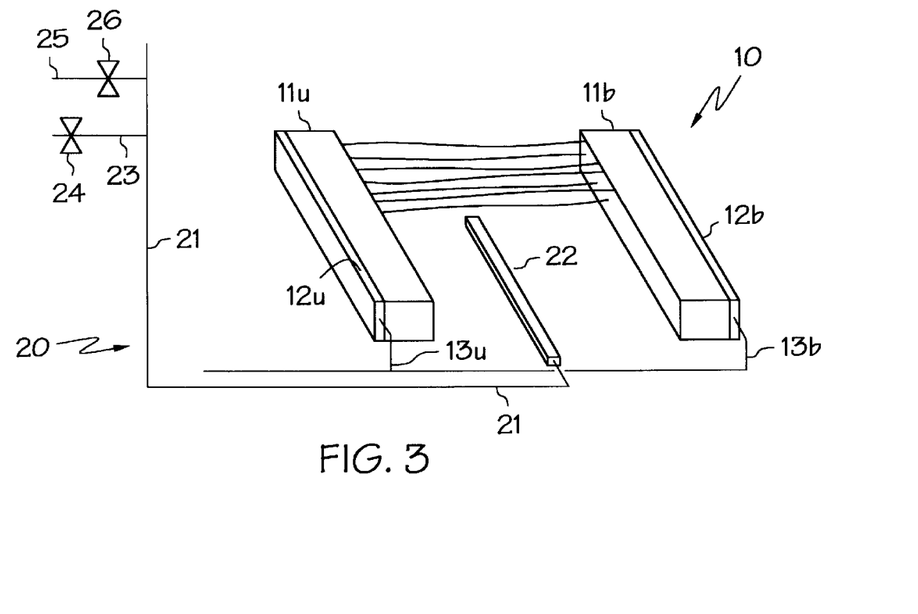
FIG. 3 is a perspective view of another scrubbing assembly schematically illustrating two arrays of a skein in which longitudinal fibers are disposed in plural, generally lateral planes, the skein's headers being mounted in a lateral or "flat" configuration.

Referring to FIG. 3 there is shown a skein in which the headers 11u and 11b are mounted "flat" on their sides, laterally spaced apart in essentially the same horizontal x-y plane, and at least one aerator 22 is placed between them under the fibers. Typically, multiple skeins may each be mounted as shown in a cassette, one skein vertically directly above the other to present multiple arrays in successive x-y planes.

Figure 4:
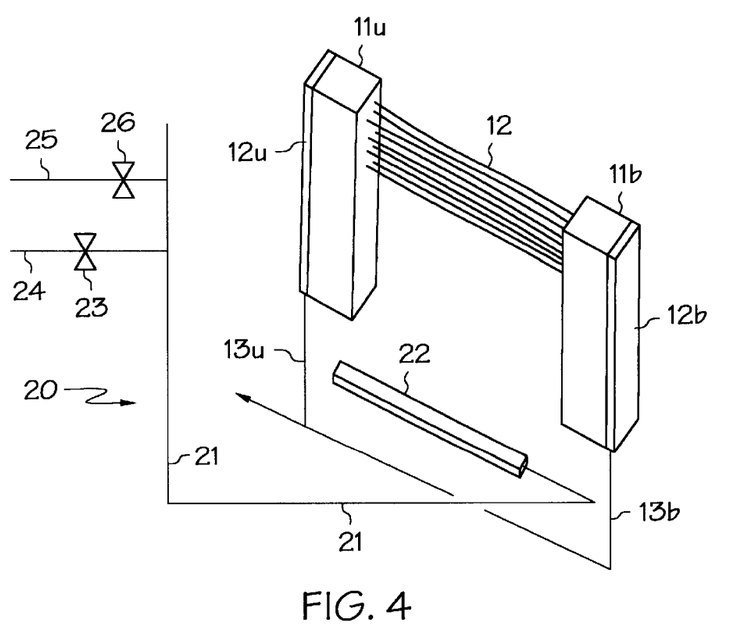
FIG. 4 is a perspective view of another scrubbing assembly schematically illustrating two arrays of a skein in which longitudinal fibers in lateral planes are disposed in generally vertical planes, the box-shaped headers being mounted vertically, "on-end".

Referring to FIG. 4 there is shown a skein in which the headers 11u and 11b are mounted "on end", laterally spaced apart in essentially the same vertical plane, and at least one aerator 22 is placed coextensively under the fibers. Typically, multiple skeins may each be mounted as shown in a cassette, one laterally spaced-apart from another to present multiple arrays in successive x-z planes.

After skeins are in operation for about one day, or when there is evidence that the equilibrium permeability at which the skein operates begins to decrease, whichever is sooner, the aerator is flushed with a desired two-phase mixture of air/permeate (hereafter referred to as air/water ). Alternatively, an aerator may first be flushed with permeate (water) alone, and flushing air then introduced into the permeate line to the aerator, each for a short period. In addition, the aerator my be flushed with flushing air alone, for a short period, before or after flushing with a two-phase mixture. In all cases the flow of permeate in a flushing cycle is limited to less than 15 min to minimize the amount returned to, and which is to be re-filtered from, the wastewater.

The effectiveness of the periodic flushing with the two-phase flushing stream allows substrate from the tank to be used instead of permeate in those instances in which the physical characteristics of the solids in suspension, and their concentration are such as to permit their use; the immediate advantage of doing so is to avoid returning permeate to the substrate to be re-filtered.

The necessity of using low pressure air for scrubbing fibers with coarse bubbles requires that the effective orifice diameter be at least 2 mm, preferably in the range from 3 mm to 10 mm. The configuration of an aerator is not critical, but it is preferred that its shape correspond generally to the shape of the skein, whether rectangular or cylindrical, or of arbitrary shape, so as to provide an essentially continuous uniform flow of a stream of bubbles through and around the fibers, minimizing wasted air.

It is found that under the specified conditions, the discrete masses of permeate moving at high-velocity longitudinally through the aerator's body have sufficient momentum to remove deposits from the orifices of the aerators. The two-phase mixture is preferably used in a volumetric ratio of air:water in the range from about 5:1 to 1:3, most preferably from 2:1 to 1:2. The volume of air is computed at standard conditions, namely 20° C. and 1 atm. The temperature at which scrubbing air or flushing air and flushing water are introduced to the aerator are not critical, the operating temperature of the substrate in the tank being preferred.

Skein fibers are maintained essentially free from particulate deposits, with surprisingly little scrubbing air, so that the permeability at equilibrium is maintained over a long period, typically from 50 hr to 1500 hr. The mass flow of air through air-distribution means 20 is proportional to the number of fibers. The flow is generally in the range from 0.47–14 $cm^3$/sec per fiber (0.001–0.03 scfm/fiber) (standard $ft^3$ per minute per fiber), typically in the range from 1.4–4.2 $cm^3$/sec/fiber (0.003–0.009 scfm/fiber). The surface area of the fibers is not used to define the amount of air used because the air travels substantially vertically along the length of each fiber.

Satisfactory operation of such open-bottom aerators requires a level aerator. If not level, distribution of low pressure air (required to be at a pressure less than 14 kPa above atmospheric pressure) is not uniform along the length of each row of orifices. Moreover, since the air-substrate interface must be maintained beneath the lowest row of orifices but above the bottom edge of the sidewalls, foaming of the substrate not only produces an unreliable interface but also results in forming tough, rubbery or hard deposits which stick to the inner surfaces of the aerator and are lodged as solids in the orifices. Such blocking exacerbates the problems of levelling and foaming, resulting in a non-uniform distribution of bubbles through the remaining orifices. Blasting an aerator's chamber with a jet of flushing air, as is conventionally done in a municipal sewage treatment plant when a visual check indicates mixing is impaired, serves to loosen only some of the deposits because the air not trapped between discrete masses of water, finds its path of least resistance under the edges of the sidewalls.

For the foregoing reasons it is most preferred to use a closed-bottom aerator in which, during operation, the aerator's main chamber is substantially free of water, and the effect of a flushing stream of a two-phase mixture of air and permeate is enhanced. The flushing stream is optimally discharged longitudinally through an elongated closed-bottom aerator; and, circumferentially through an annular closed-bottom one. The velocity of the flushing stream through the body is effective to loosen deposits and flush them out of a large diameter discharge leg, into the substrate from which the deposits were generated.

Figure 5:
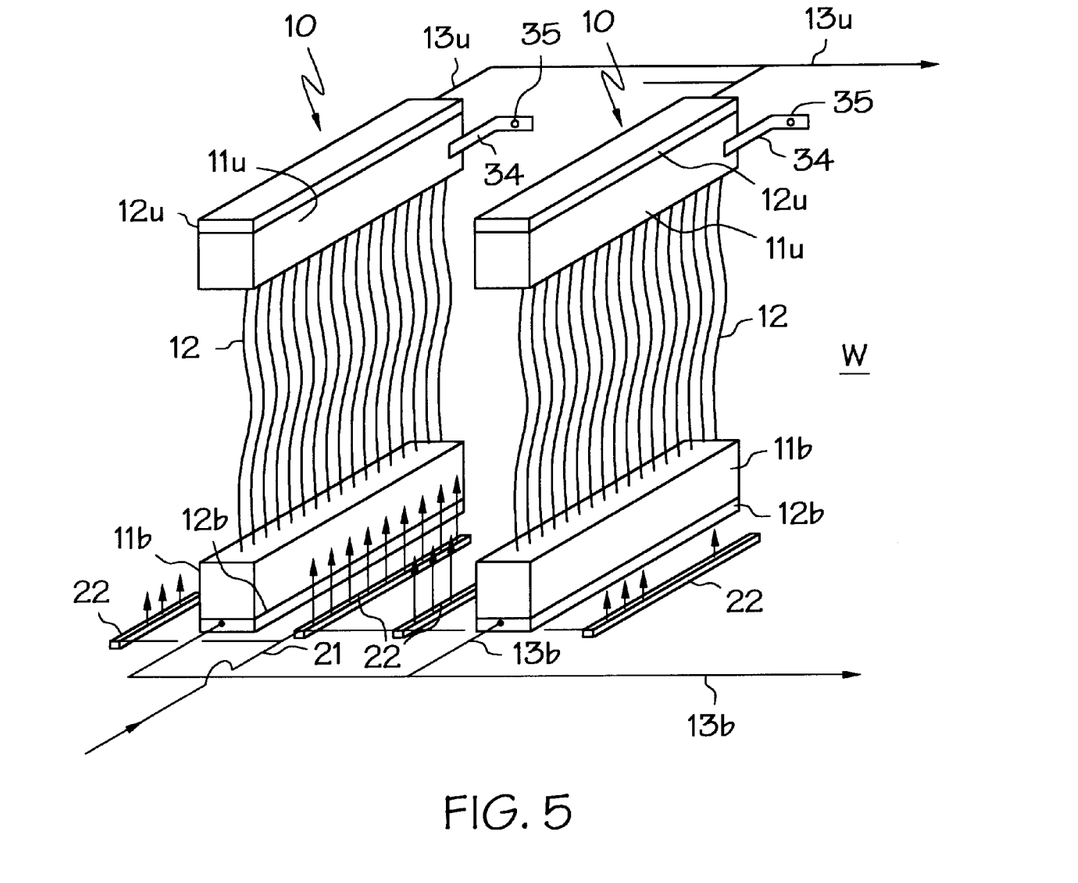
FIG. 5 is a perspective view schematically illustrating a pair of submerged vertical skeins used in a "bank" or "cassette" mounted within the tank, each skein having a pair of aerators.

Referring to FIG. 5, there is illustrated a cassette having a pair of essentially identical side-by-side skeins 10 mounted in wastewater held in a tank. Each skein includes a pair of side-by-side stacks, each similar to, and mounted as, the one described in FIG. 1 to wall W so as to provide space for conventional closed-bottom aerators 22 having a water-seal leg (such as shown in U.S. Pat. No. 3,339,901 to Walker or U.S. Pat. No. 4,474,714 to Downs) beneath and adjacent to each lower header. The aerators are horizontally disposed on either side of headers 11b, preferably below the horizontal plane through the horizontal center-lines of the headers. Details of construction of a preferred skein are disclosed in the aforesaid Ser. No. 08/690,045 and U.S. Pat. No. 5,639,373, the disclosures of which are incorporated by reference thereto as if fully set forth herein.

Skeins in which the headers are positioned in essentially the same plane and the fibers are disposed arcuately therebetween are disclosed in the aforesaid '424 patent. A horizontal configuration of each skein is particularly effective when plural skeins are stacked directly above one and another so that fibers in successive arrays intercept bubbles rising through them. The more skeins that are stacked, the more fibers are scrubbed by the same bubbles making for efficient use of air. In such a stacked configuration it is sufficient that the fibers have the "slack" defined above. Thus such benefits as are lost due to lack of fiber-to-fiber rubbing in longer fibers which provide an arcuate skein and much "swaying" in the rising bubbles are compensated for by the number of successive fibers which are scrubbed by the same rising bubbles. Most preferred is a header in combination with an aerator, referred to as a "header/aerator" such as is disclosed in the aforesaid '373 patent, which header/aerator may be used as the lower header in a skein being used in a vertical configuration, and for both the upper and lower headers when plural skeins are stacked in a horizontal configuration. In such a configuration, depending upon the length of the fibers, it may be desirable to use, in addition, conventional aerators positioned below and intermediate the header/aerators.

When the air pressure is sufficient to lower the interface 70 beneath the orifices in the air-plates (as shown), air is expelled through the orifices through both sidewalls, and also through the transverse passages in the central wall so as to escape between the side-by-side skeins.

It is most preferred to use inlet deflection nozzles to direct the flushing fluid laterally against the inner walls of the aerator. A preferred ratio of cross-sectional area of the orifice(s) of the inlet nozzle(s) to cross-sectional area of the air plenum is in the range from about 1:1 to about 1:5 for a closed-bottom aerator; and, from about 1:5 to about 1:25 for an open-bottom aerator. Typical velocities of flushing fluid at the inlet orifice typically ranges from 20 to 60 ft/sec.

The fibers used to form the skein may be formed of any conventional membrane material used for microfiltration provided the fibers are flexible and have an average pore cross sectional diameter for microfilitration, namely in the range from about 0.01 $\mu$m to 1.0 $\mu$m. Preferred fibers and the manner of potting them in a fixing material are disclosed in the aforesaid '373 patent. For hollow fiber membranes, the outside diameter of a fiber is at least 20 $\mu$m and may be as large as about 3 mm, typically being in the range from about 0.1 mm to 2 mm. The larger the outside diameter the less desirable the ratio of surface area per unit volume of fiber. The wall thickness of a fiber is at least 5 $\mu$m and may be as much as 1.2 mm, typically being in the range from about 15% to 60% of the outside diameter of the fiber, most preferably from 0.5 mm to 1.2 mm thick.

EXAMPLE

Filtration efficiency is measured by comparing TMP in a pair of identical Zenon ZW500 (standard) skeins after operation for 10 days of side-by-side operation in a bioreactor, only one of which was periodically flushed. Each skein was aerated with a header/aerator, such as illustrated in FIGS. 4 and 5, each having air-plates with 32 orifices, each 6 mm in diameter. Each skein was backflushed with permeate for 30 seconds at 10 min intervals. The TMP is measured by reading the absolute pressure registered on a gauge monitoring pressure in the permeate line. The TMP of each skein was measured daily (every 24 hr) during operation for 10 days. After about a day, when the permeability in each skein had reached equilibrium, indicated by the TMP in each being substantially the same, the speed of each identical positive displacement pump (for each skein) was set to withdraw permeate from at a rate of 40 liters/min (8.8 USgal/min) while each was aerated with 0.566 SCMM (std. cu. meters/min) or 20 SCFM of air. One header/aerator was flushed by injecting 0.1416 SCMM (5 SCFM) of air at 652.5 kPa (80 psig) throttled with a suitably sized orifice to enter the flush water stream at a pressure slightly higher than the water pressure at that location in the line, in cycles, alternating a 5 sec injection of air with a 5 sec shut-off of the air into the permeate stream at a flow rate of 113.65 L/min (25 USgpm); and the flushing stream is kept flowing for 1 min. The other header/-aerator was not periodically flushed.

The fibers in each ZW500 skein are each 1.6 meters long, coated with a semipermeable membrane, so as to have an o.d. of 1.9 mm and an i.d. of 0.7 mm, and together provide 46.45 m$^2$ (500 ft$^2$) of filtration surface area. The bioreactor, with a diameter of 1.32 meters (52 inches) and 2.75 m (108") high, and containing 4546 L (1000 USgal) of activated sludge at 20 g/L TSS (total suspended solids), is fed raw sewage screened through 2 mm mesh, at 250 USg/hr, from the city of Burlington, Ontario. The TSS were maintained at 18 to 20 g/L by periodically wasting a portion of the activated sludge.

After 10 days the skein with the header/aerator which had been flushed periodically showed a TMP of 31.7 kPa (4.6 psia); the other skein showed a TMP of 54.43 kPa (7.9 psia), which is about 70% higher than that of the skein with the header/aerator which was flushed. The skeins were then removed from the tank and inspected.

The fibers in the skein which had not been flushed showed solids accumulated on them to such an extent that about 20 to 30% of the fibers were agglomerated. Inspection of this skein's header/aerator showed that there was accumulation of hardened or partially dehydrated sludge on the internal walls away from the air entrance. Accumulated sludge had occluded 11 of the 32 air orifices in the aerator. The heaviest build-up of solids was in those fibers directly above the occluded orifices, indicating that the lack of a uniform flow of scrubbing bubbles is the cause. The fibers in the skein with the flushed header/aerator showed insignificant accumulation of solids on their surfaces. Inspection of the flushed aerator/header showed all orifices were essentially free of solids deposited at their peripheries, and the internal walls were essentially free of deposited solids.

Having thus provided a general discussion, described the overall method in detail, and illustrated the invention with a specific example of the best mode of carrying out the process, it will be evident that the invention has provided an effective solution to the problem stated. It is therefore to be understood that no undue restrictions are to be imposed by reason of the specific embodiments illustrated and discussed, and particularly that the invention is not restricted to slavish adherence to the details set forth herein.

We claim:

1. In a method for maintaining production of permeate at equilibrium flux, in a skein submerged in a solids-containing substrate held in a tank, continuously, by scrubbing hollow fiber membranes ("fibers") of said skein with bubbles generated from scrubbing gas flowed into an aerator, the improvement comprising, supplying said scrubbing gas to said aerator's air plenum at a pressure greater than the liquid head between the surface of substrate in the tank and the surface of the substrate in the plenum;

maintaining a substantially uniform flow of a stream of said bubbles through each of plural orifices in lateral walls of said aerator, in which stream the majority are coarse bubbles having an effective diameter in excess of 3 mm and rise at a velocity in the range from about 5 ft/sec to 10 ft/sec (1.5 m/sec to 3 m/sec); periodically returning permeate to said aerator through a conduit means connected thereto;

injecting a desired amount of said flushing gas into said permeate in said conduit means within an injection period of less than 10 min so as to flush said aerator with a two-phase mixture of flushing gas and permeate flowing laterally through said aerator, in a volumetric ratio of flushing gas:permeate in the range from about 1:2 to about 25:1, said gas in said mixture being at elevated pressure, above that of permeate flowing in said permeate line, and in addition, sufficient to overcome a hydrostatic head above said aerator, so as to provide discrete dispersed masses of permeate which impinge against internal walls of said aerator;

maintaining flow of said two-phase mixture for less than 10 min; and, returning loosened solid deposits from within said aerator into said substrate; and, re-establishing flow of said scrubbing gas.

2. The method of claim 1 wherein periodic flushing is effected, repetitively, after a period in the range from about 4 hr to about 72 hr;

said flushing gas is introduced into said plenum at a pressure in the range from about 5 cm to about 50 cm above the hydrostatic head exerted at the lowest orifices in the walls of an open-bottom the aerator, and for a closed-bottom aerator, said pressure is increased by the height of the water-seal leg; and, prior to said flushing, periodically, without interrupting filtration, returning permeate to said vessel through a permeate line connected to said aerator.

3. The method of claim 2 comprising, sensing the pressure of permeate supplied;

sensing the pressure of said flushing gas supplied; and, mixing said injected flushing gas and said permeate prior to entering said aerator.

4. The method of claim 2 wherein said scrubbing gas is air supplied at a pressure in the range from greater than 1 atm to 1.5 atm (atmospheres).

5. The method of claim 4 wherein the ratio of cross-sectional area of the orifice(s) of the inlet nozzle(s): cross-sectional area of the air plenum is in the range from about 1:1 to about 1:5 for a closed-bottom aerator; and, from about 1:5 to about 1:25 for an open-bottom aerator.

6. The method of claim 4 wherein said flushing gas is injected for a period of less than 1 min, and the velocity of said mixture at the inlet orifice is in the range from about 20 to about 60 ft/sec.

7. A system for maintaining a skein submerged in a tank, and operating at equilibrium flux to produce permeate from a solids-containing substrate continuously, by scrubbing fibers of said skein with an inert scrubbing gas in the form of coarse bubbles generated in an aerator, said system comprising in combination,     a skein and a coarse bubble aerator disposed beneath said skein said aerator having an inlet for said scrubbing gas and flushing fluid;

means for supplying said aerator with said scrubbing gas at a predetermined pressure sufficient to maintain a substantially uniform flow of a stream of said bubbles through each of plural orifices in lateral walls of said aerator, in which stream the majority are coarse bubbles having an effective diameter in excess of 3 mm and rise at a velocity in the range from about 5 ft/sec to 10 ft/sec (1.5 m/sec to 3 m/sec);

means for returning said permeate to said aerator, upstream and exteriorly thereof;

means for injecting flushing gas into said means for returning said permeate;

said means for returning said permeate being in selective open communication with said means for supplying said aerator with said flushing gas;

means to control flow of said returning permeate for a chosen period in the range from 5 seconds to 10 min; and,     means to control the amount of said flushing gas injected into said permeate within a chosen period of time less than 10 min, independently, so as to provide said flushing fluid as discrete dispersed masses of permeate which impinge laterally against internal walls of said aerator.

8. The system of claim 7 wherein lateral direction of said mixture is effected with orifice means in said inlet conduit having an effective diameter sufficient to provide a velocity of said mixture in the range from 20 ft/sec to about 60 ft/sec.

* * * * *